(12) United States Patent
Bevard et al.

(10) Patent No.: US 11,608,937 B2
(45) Date of Patent: Mar. 21, 2023

(54) SEPARATION AND VENTING CRYOGENIC LIQUID FROM VAPOR ON A MOBILE MACHINE

(71) Applicant: Caterpillar Inc., Peoria, IL (US)

(72) Inventors: Brian M. Bevard, Oro Valley, AZ (US); Derek Samsel, Tucson, AZ (US); Manikandan Natarajan, Marana, AZ (US); Joshua Perko, Washington, IL (US); Matthew Jordan Engfehr, Dunlap, IL (US); Roderick S. Zehrung, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 431 days.

(21) Appl. No.: 16/777,374

(22) Filed: Jan. 30, 2020

(65) Prior Publication Data

US 2021/0239273 A1 Aug. 5, 2021

(51) Int. Cl.
*F17C 7/04* (2006.01)
*F17C 9/02* (2006.01)
(Continued)

(52) U.S. Cl.
CPC ............... *F17C 7/04* (2013.01); *F17C 1/12* (2013.01); *F17C 5/02* (2013.01); *F17C 9/02* (2013.01); *F17C 2201/0119* (2013.01); *F17C 2201/032* (2013.01); *F17C 2203/03* (2013.01); *F17C 2221/033* (2013.01); *F17C 2223/0161* (2013.01); *F17C 2225/013* (2013.01); *F17C 2225/0123* (2013.01); *F17C 2260/021* (2013.01); *F17C 2270/0168* (2013.01)

(58) Field of Classification Search
CPC .... F17C 7/04; F17C 1/12; F17C 13/04; F17C 9/02; F17C 2201/0119; F17C 2201/032; F17C 2221/033; F17C 2223/0161; F17C 2225/0123; F17C 2270/0168; F17C 2270/0171
USPC .......................................................... 123/525
See application file for complete search history.

(56) References Cited

U.S. PATENT DOCUMENTS

| 3,492,793 A | 2/1970 | Bhuta et al. |
| 3,788,096 A | 1/1974 | Brilloit |

(Continued)

FOREIGN PATENT DOCUMENTS

| CN | 203907209 U | 10/2014 |
| CN | 204502476 U | 7/2015 |

(Continued)

*Primary Examiner* — Lindsay M Low
*Assistant Examiner* — Omar Morales
(74) *Attorney, Agent, or Firm* — von Briesen & Roper, s.c.

(57) ABSTRACT

In accordance with one aspect of the present disclosure, a mobile machine includes a LNG fuel tank to provide natural gas to a natural gas engine, a pressure relief valve to relieve pressure to a relief vent line, and a liquid separation device. The liquid separation device includes a canister defining an interior space and having a top end and a bottom end, a LNG inlet configured to receive mixed phase fluid into the canister from the relief vent line, a separator disposed within the interior space and fluidly connected to the LNG inlet, the separator configured to direct condensed liquid to the bottom end and to pass vapor to the interior space, a vapor outlet disposed on the top end of the canister, and a liquid drain disposed on the bottom end of the canister.

15 Claims, 5 Drawing Sheets

(51) Int. Cl.
    *F17C 1/12*     (2006.01)
    *F17C 5/02*     (2006.01)

(56) References Cited

U.S. PATENT DOCUMENTS

| | | |
|---|---|---|
| 3,857,251 A | 12/1974 | Alleaume |
| 4,203,299 A * | 5/1980 | Dinglinger ............... B01J 4/008 |
| | | 62/49.2 |
| 6,257,210 B1 | 7/2001 | Kim |
| 7,581,405 B2 | 9/2009 | Higginbotham et al. |
| 2014/0318503 A1* | 10/2014 | Kang ................... F02M 21/06 |
| | | 123/506 |
| 2019/0032851 A1* | 1/2019 | Adler ........................ F17C 5/06 |
| 2019/0366238 A1 | 12/2019 | Yu et al. |

FOREIGN PATENT DOCUMENTS

| | | |
|---|---|---|
| CN | 103883398 B | 8/2016 |
| JP | 2004308844 | 11/2004 |
| JP | 2006274961 | 10/2006 |
| KR | 20120051461 | 5/2012 |
| RU | 2399508 C2 | 9/2010 |

\* cited by examiner

SEPARATION AND VENTING CRYOGENIC LIQUID FROM VAPOR ON A MOBILE MACHINE

TECHNICAL FIELD

The present disclosure generally relates to work machines, and more particularly relates to systems and methods of operating machines powered by liquid natural gas.

BACKGROUND

Mobile work machines may be powered by various types of engines. Said work machines may be, but are not limited to, dump trucks, earth moving machines, and the like. Example engines include internal combustion engines and engines powered by liquid/liquified natural gas (LNG). At times, a mobile machine may initially be built with an internal combustion engine, such as being a diesel-only engine, but at a later point be converted to a LNG-powered mobile machine.

Such a conversion may retain a majority of the structure (e.g., chassis, cab, haul bed) of the mobile machine in place, and replace or supplement the initial engine with components for a LNG system, including a natural gas engine and LNG fuel tank. In such an example, an initially installed gas tank and engine associated with the mobile machine may be removed, and a LNG fuel tank and a natural gas engine may be installed. Additional components, such as a vaporizer and LNG pressure relief valves, may also be added during the conversion to assist with the operation of the LNG system.

In adding these new components, they are often placed around the existing structure of the mobile machine and may further be constrained by additional regulations to place, or locate, the additional components in specified locations. For example, the size, capacity, and the vent location of a LNG pressure relief vent line may all be specified and constrained by various safety and industry related regulations.

When conforming to these regulations in various mobile machine designs, such as when converting a large mining truck (LMT) from a diesel-only engine to a natural gas engine, a location of a LNG vent line may still result in undesired locations for venting of the fluid/gas from the LNG system.

Various systems, such as cryogenic gas traps, exist for separating out one constituent from a flow of gas. For example, U.S. Pat. No. 3,788,096A describes a cryogenic gas trap for separating out at least one constituent from a flow of gas. The coefficient of exchange between a condensation surface and a cryogenic fluid which cools said surface is substantially improved by utilizing fluid in the two-phase gas-vapor form. The gas trap comprises a first condensation surface formed by a nest of vertical metallic tubes arranged around and at a distance from a second condensation surface in the interior of which is arranged a tank containing cryogenic liquid. The tubes communicate at one extremity with an annular conduit comprised between a casing and the tank. At the other extremity is a manifold. However, such a cryogenic gas trap would be insufficient for operations of a mobile machine, and in particular for separating and venting cryogenic liquid from vapor on a mobile machine.

There is consequently a need for a systems and methods of venting cryogenic liquid from vapor on a mobile machine that is powered with a LNG system.

SUMMARY

In accordance with one aspect of the present disclosure, a mobile machine includes a liquid natural gas (LNG) system. As part of the LNG system, the mobile machine may include a natural gas engine. The mobile machine further includes a LNG fuel tank to provide natural gas to the natural gas engine, a relief valve or relief valves to relieve excess pressure from the LNG system to a relief vent line, and a liquid separation device. The liquid separation device includes a canister defining an interior space and having a top end and a bottom end, a LNG inlet configured to receive mixed phase fluid into the canister from the relief vent line, a separator disposed within the interior space and fluidly connected to the LNG inlet, the separator configured to direct condensed liquid to the bottom end and to pass vapor to the interior space, a vapor outlet disposed on the top end of the canister and a liquid drain disposed on the bottom end of the canister.

In yet another embodiment, a liquid separation device includes a canister defining an interior space and having a top end and a bottom end, a liquid natural gas (LNG) inlet configured to receive mixed phase fluid into the canister, a separator disposed within the interior space and fluidly connected to the LNG inlet, the separator configured to direct condensed liquid to the bottom end of the canister and to pass vapor to the interior space, a vapor outlet disposed on the top end of the canister, and a liquid drain disposed on the bottom end of the canister.

Yet another embodiment takes the form of a kit. The kit includes a canister defining an interior space, with the canister having: a liquid natural gas (LNG) inlet disposed at a top end of the canister, the LNG inlet configured to receive mixed phase fluid into the canister, a vapor outlet disposed at the top end of the canister, and a liquid drain disposed at a bottom end of the canister. The kit further includes a separator configured to direct condensed liquid to the bottom end and to pass vapor through to the interior space, and tubing configured to fluidly connect the LNG inlet to the separator, wherein the separator is disposed in the interior space when connected to the LNG inlet. Mounting connections are configured to mount the canister to a mobile machine, and a fluid drain line is configured to fluidly connect to the liquid drain and to route condensed liquid from the bottom end of the canister to a ground surface.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
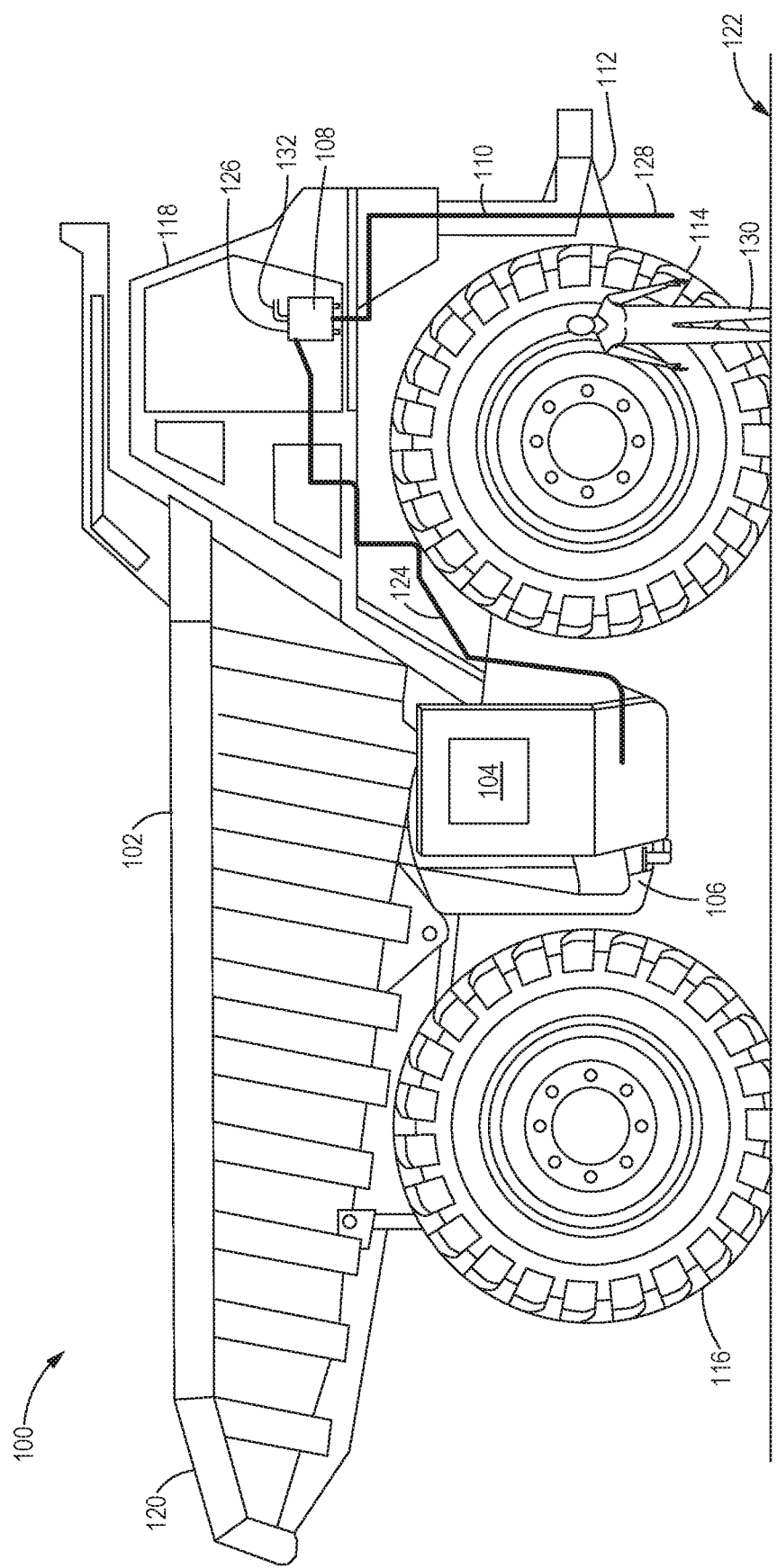
FIG. 1 is a side view of a mobile machine, in accordance with an embodiment of the present invention.

FIG. 1 is a side view of a mobile machine, in accordance with an embodiment of the present invention. In particular, FIG. 1 depicts the side view 100 of the mobile work machine 102, which may be referred to as a work machine, a mobile machine, a LNG machine, and the like throughout. The work machine 102 is exemplarily shown as a haul or a dump truck, but the teachings of this disclosure may be employed with equal efficacy on many other types of work machines such as but not limited to track type tractors, excavators, mining equipment, motor graders, and the like. The mobile machine 102 includes an engine 104 and a LNG fuel tank 106 to provide natural gas to the engine 104. These, and other components such as the vaporizer 208, the liquid separation device 108, and various connecting lines, may collectively be referred to as a LNG system, which may operation on various mobile or stationary machines. The engine 104 powers the mobile machine 102. For example, it may provide power for propulsion to its drive train, may be configured to power auxiliary systems such as hydraulics to manipulate the haul bed 120, and may be used to generate electricity for various electronics and control systems associated with the mobile machine 102.

One added component to a mobile machine 102 during an LNG system conversion includes adding an LNG vent line 124 that is shown as extending from the engine 104 and the LNG fuel tank 106 up and to the right (as pictured in the side view 100). The LNG vent line 124 extends to a vent location 126 that is located above the front ground engaging member 114 and near an operator cab 118. The vent location 126 may be designated by various safety and/or industry regulations. A liquid separation device 108 is fluidly connected to the LNG vent line 124. A fluid drain line 110 is fluidly connected to the liquid separation device 108 and is routed such that fluid draining from the fluid drain line 110 is directed away from the ground engaging member 114 and away from areas of the mobile machine 102 that personnel may typically access. Example routing locations for the fluid drain line 110 include disposing the distal end 128 of the fluid drain line 110 under a chassis 112 of the mobile machine, between a left front ground engaging member 114 and a right front ground engaging member 114, and the like. The distal end 128 of the fluid drain line 110 directs any fluid towards the ground surface 122 and away from areas personnel may access (e.g., near points of egress of the operator cab 118, adjacent to and the ground engaging members 114, 116).

The mobile machine 102 is positioned on a ground surface 122, with its front ground engaging member 114 on the right portion of the side view 100 and the rear ground engaging member 116 on the left portion of the side view 100. There may be a pair of front ground engaging members 114 and a pair of rear ground engaging members 116, with one of each pair on the right side (as shown in the side view 100) and another one of each pair on the left side of the mobile machine 102.

The ground engaging members 114, 116 may comprise rubber, synthetic rubber, or the like. The ground engaging members 114, 116 may be experience a shortened lifespan when exposed to rapid changes in temperature, which may occur under conditions when liquid natural gas is exposed directly to the rubber-based materials of the ground engaging members 114, 116.

As shown in the side view 100, the mobile machine 102 includes the operator cab 118 that includes controls to operate the mobile machine 102. Further, the ground engaging members 114, 116 may be taller than an average human 130, and may serve to elevate an operator cab 118 of the mobile machine 102 approximately three to four meters above the ground surface 122. In some such embodiments, the mobile machine 102 is a large mining truck (LMT). The liquid separation device 108 is mounted on the mobile machine 102 at the vent location 126. The liquid separation device 108 further includes a vapor outlet 132. When mounted on the mobile machine 102 that is located on a level ground surface 122, the vapor outlet 132 is at a higher elevation than the location that the fluid drain line connects to the liquid separation device 108. The higher elevation of the vapor outlet 132 further ensures that vented vapor does not get trapped under components of the mobile machine 102.

Figure 2:
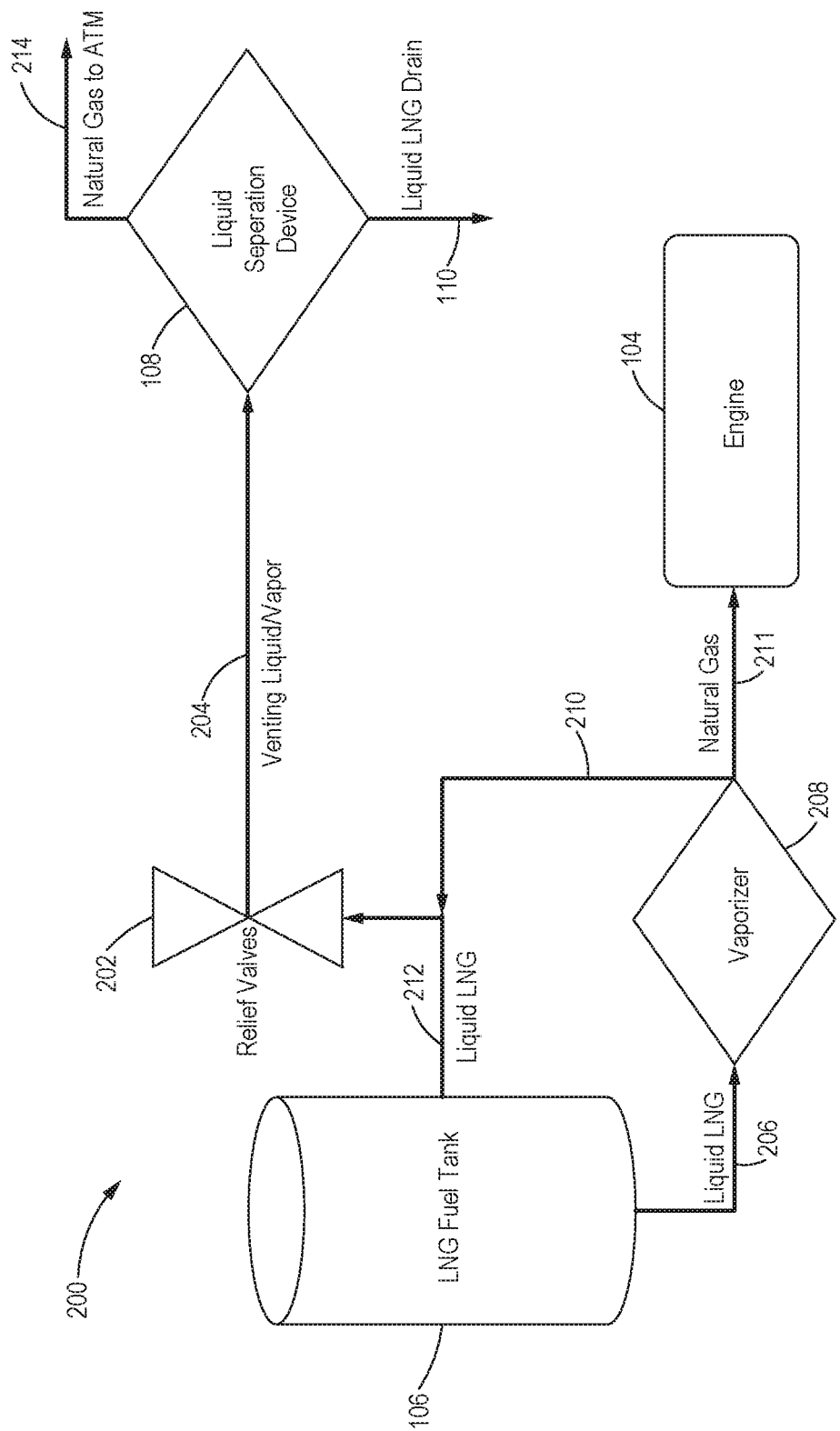
FIG. 2 is a simplified schematic of a LNG system of a mobile machine, in accordance with an embodiment of the present invention.

FIG. 2 is a simplified schematic of a LNG system of a mobile machine, in accordance with an embodiment of the present invention. In particular, the schematic 200 includes the engine 104 which may be a natural gas engine, the LNG fuel tank 106, a vaporizer 208, and pressure relief valves 202. A liquid LNG line 206 fluidly connects the LNG fuel tank 106 to the vaporizer 208. The vaporizer 208 converts liquid natural gas to natural gas and provides the natural gas, via the natural gas line 211 to the engine 104. The pressure relief valves 202 are fluidly connected to the LNG fuel tank 106 via the liquid LNG line 212 and the natural gas line 210. The pressure relief valves 202 are designed to protect aspects of the LNG system from over-pressure conditions. The size and quantity of the pressure relief valves 202 may be determined in part based on the operating characteristics of the LNG system, such as the LNG fuel tank 106 capacity, the engine 104 output limits and the like. The liquid/vapor vent line 204 fluidly connects the pressure relief valves 202 to the liquid separation device 108. In the side view 100 of FIG. 1, portions of the LNG vent line 124 may be realized by all or some of the liquid LNG line 212, the natural gas line 210, the pressure relief valves 202, and the liquid/vapor vent line 204.

In the embodiments disclosed herein, the pressure relief valve 202 is configured to relieve excess pressure from the LNG system, including the LNG fuel tank 106, to the liquid/vapor vent line 204 that acts as a relief vent line. When a pressure relief valve 202 lifts, it may initially release natural gas in a vapor state. However, as components in the relief path (e.g., the liquid/vapor vent line 204, the liquid separation device 108) are cooled by the flow of the natural gas in its vapor state, the flow from the relief valve may transition into a two phase flow (e.g., mixed phase flow) or a fluid state. The liquid/vapor vent line 204 may then carry natural gas in two phases, liquid and vapor, as it exits the LNG system. This may be referred to as a mixed phase flow.

In various embodiments, the liquid/vapor vent line 204 may be realized by a single line, or many lines. The liquid/vapor vent line 204 may also include any of the fluid connections to reduce the number of individual vent lines. For example, in an embodiment with four pressure relief valves 202, each of the four pressure relief valves 202 may have a single line that receives fluid output from one of the pressure relief valves 202 when the respective pressure relief valve 202 lifts due to an overpressure condition in the LNG system. In one embodiment, two of these lines may be fluidly connected (e.g., by a T-connection) into a first intermediate line and another two of these lines may be fluidly connected into a second intermediate line. The first and second intermediate lines may then be fluidly connected into a final vent relief line and routed to the liquid separation device 108. In another such embodiment having four pressure relief valves 202, four separate lines are routed to the liquid separation device 108 without first reducing the number of lines being routed to the liquid separation device 108. All four of these lines may enter the liquid separation device 108, or they may be fluidly connected to a single point just before the liquid separation device 108. The liquid separation device 108 further includes a fluid drain line 110 and a vapor vent 214 that vents the vapor from the liquid separation device 108 to the atmosphere.

Figure 3:
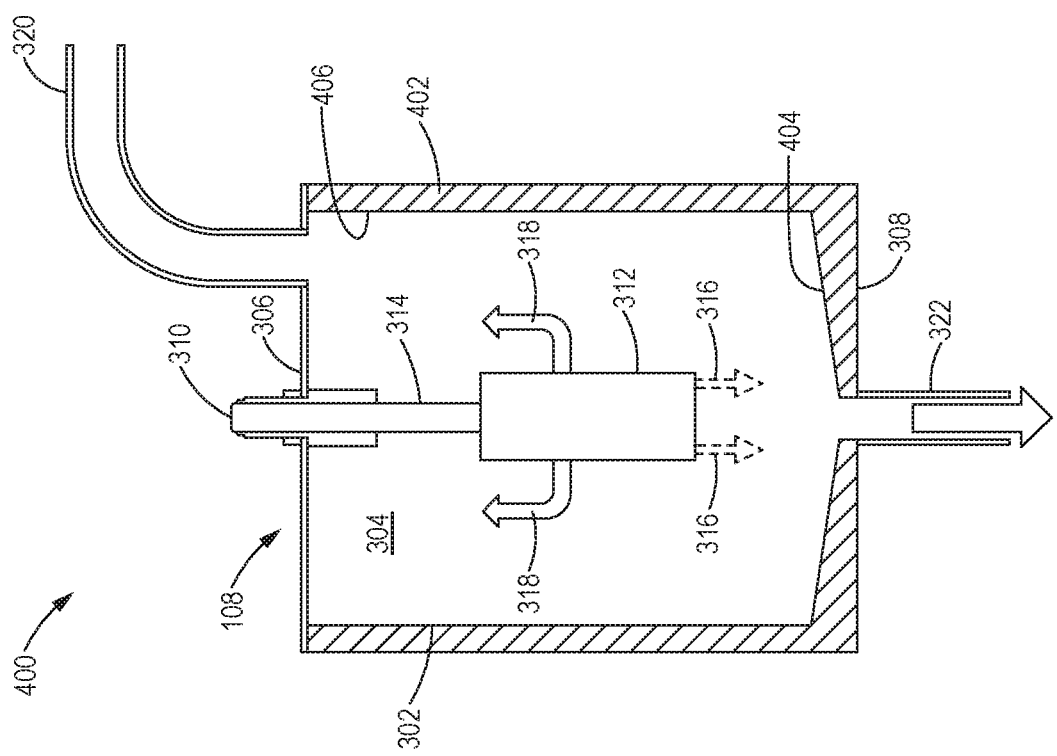
FIG. 3 is a first cross-sectional view of a liquid separation device, in accordance with an embodiment of the present invention.

FIG. 3 is a first cross-sectional view of a liquid separation device, in accordance with an embodiment of the present invention. In particular, FIG. 3 depicts the first cross-sectional view 300 of the liquid separation device 108. The liquid separation device 108 includes a canister 302 that defines an interior space 304. The canister 302 further includes a top end 306 and a bottom end 308 that is located opposite from the top end 306. The use of the terms "top" and "bottom" is used herein to describe the relative location of the top end 306 to the bottom end 308 when the liquid separation device 108 is installed within or mounted to a mobile machine 102 (e.g., when mounted to the mobile machine 102 via the mounting connection 324). The canister 302 may be a cylinder, or in other embodiments, it may be in the shape of a rectangular prism.

The liquid separation device 108 further includes an LNG inlet 310 that is configured to received mixed phase fluid 326 into the canister 302. The mixed phase fluid 326 may be received into the liquid separation device 108 from the liquid/vapor vent line 204 downstream of the pressure relief valve 202.

A separator 312 is disposed within the interior space 304 and is fluidly connected (e.g., by fluid connection 314) to the LNG inlet 310. The separator 312 is configured condense liquid received from the LNG inlet 310 and to direct the condensed liquid 316 to the bottom end 308 of the canister 302. The separator 312 is further configured to pass the vapor 318 to the interior space 304. In some embodiments, the separator 312 comprises a sintered material for use in atomizing the mixed phase fluid 326 received from the LNG system (e.g., from the liquid/vapor vent line 204).

A vapor outlet 320 is disposed on the top end 306 of the canister 302 and a liquid drain 322 is disposed on the bottom end 308 of the canister 302. The vapor outlet 320 may serve as the vent location 126 that is depicted in the side view 100 of FIG. 1. The cross-sectional area of the vapor outlet 320 may be selected based at least in part on the cross-sectional area of the liquid/vapor vent line 204. Thus, in some embodiments, the cross-sectional area of the vapor outlet 320 is equal to or larger than a cross-sectional area of the liquid/vapor vent line 204. This ensures that the liquid separation device does not restrict the pressure relief flow from the LNG system.

Figure 4:
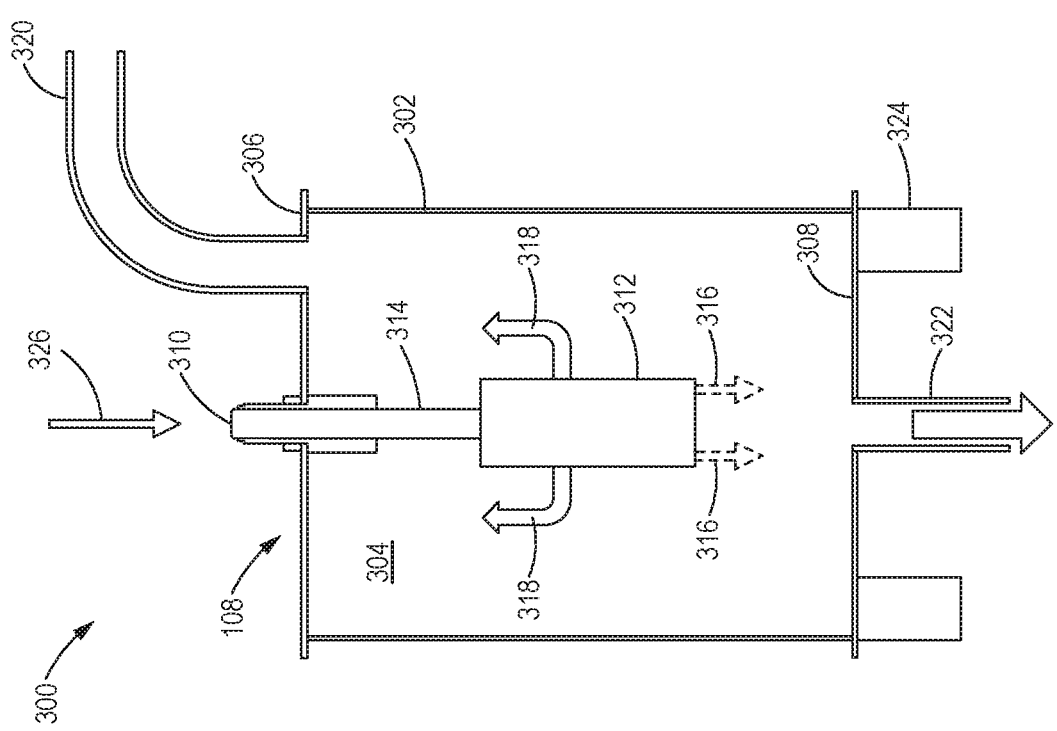
FIG. 4 is a second cross-sectional view of a liquid separation device, in accordance with an embodiment of the present invention.

FIG. 4 is a second cross-sectional view of a liquid separation device, in accordance with an embodiment of the present invention. In particular, FIG. 4 depicts the second cross-sectional view 400 of the liquid separation device 108. The liquid separation device 108 depicted in FIG. 4 is similar to that of the liquid separation device 108 depicted in the first cross-sectional view 300 of FIG. 3, with like-numbered components having the same functions, unless otherwise noted.

In FIG. 4, the liquid separation device 108 further includes an insulation layer 402 disposed on an exterior surface 406 of the canister 302. The insulation layer 402 acts to insulate the exterior surface 406 to prevent exposure of a low-temperature exterior surface 406 to personnel on the mobile machine 102.

Further, the liquid separation device 108 shown in FIG. 4 includes a sloped surface 404 on the bottom end 308 of the canister 302. Condensed liquid 316 from the separator 312 is directed towards the sloped surface 404, which then serves to direct the condensed liquid 316 towards the liquid drain 322. Thus, even when the mobile machine 102 is operating on a non-level ground surface 122, condensed liquid 316 condensed by the separators 312 may still be directed towards the liquid drain 322. The sloped surface 404 may be a frusto-conical shaped surface. As depicted in FIG. 4, then angle 408 is approximately twenty degrees, although certainly other angles may be used based on planned operating terrains of the mobile machine 102. Further, the distance between the liquid drain 322 and the vapor outlet 320 may be such that even when operating on a non-level ground surface 122, the vapor outlet 320 remains at an elevation above the liquid drain 322.

INDUSTRIAL APPLICABILITY

In general, the teachings of the present disclosure may find broad applicability in many industries, but not limited to, mobile machines having a LNG system, large mining trucks, stationary generators, and the like. In various embodiments, the liquid separation device 108 may be incorporated into a vent system of a LNG powered machine. Although described herein as being mounted on and fluidly connected to a mobile machine, the liquid separation device may also be installed on and fluidly connected to a stationary machine, such as an electric power generator.

In addition to being installed onto a machine, the various components of a liquid separation device may be assembled as a kit for installation on a machine having a LNG system. Such a kit may be assembled and installed onto the machine as part of a conversion to a LNG powered machine or as replacement parts for an existing fluid separation device that is already installed onto the LNG powered machine.

Figure 5:
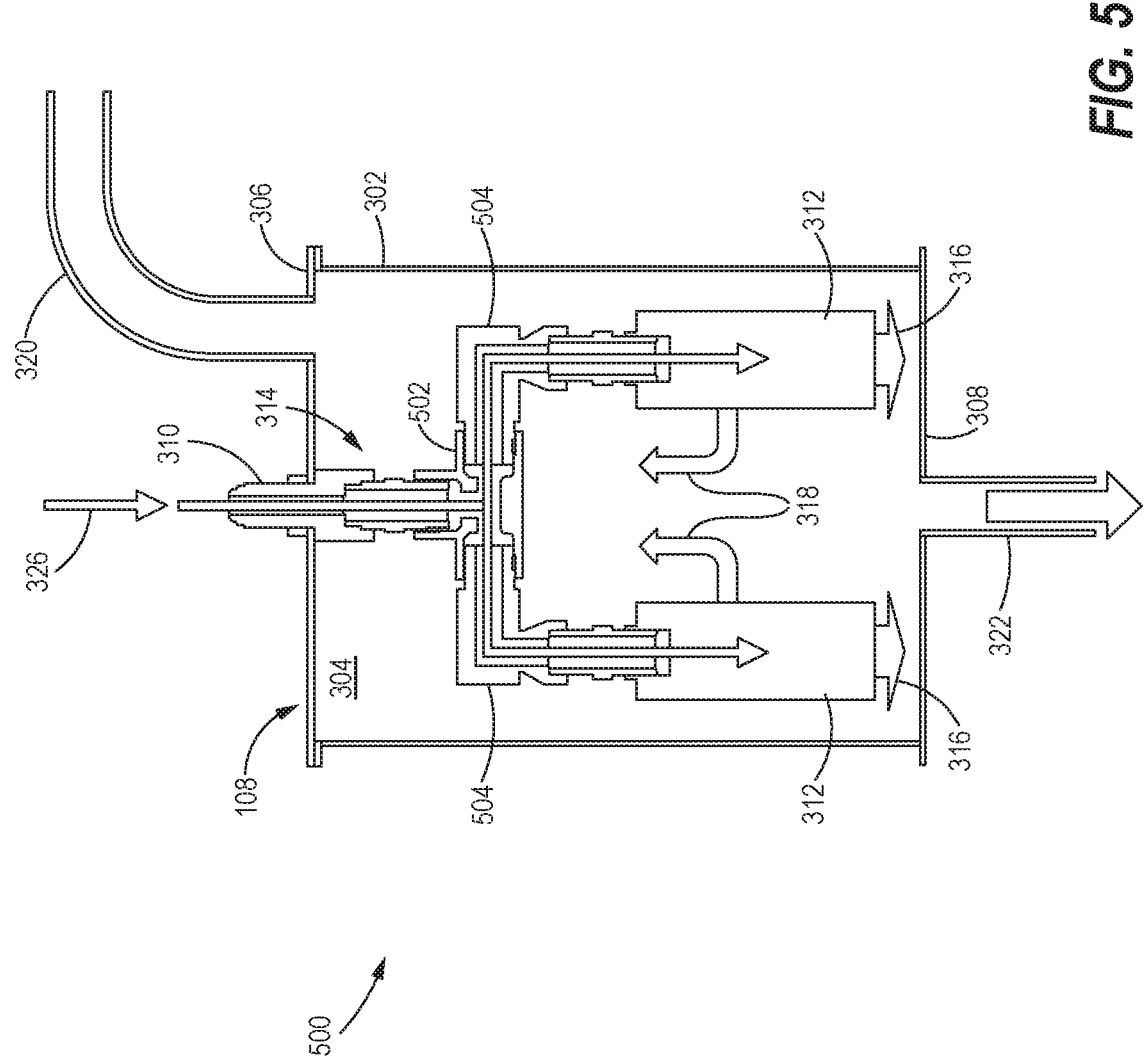
FIG. 5 is a third cross-sectional view of a liquid separation device, in accordance with an embodiment of the present invention.

FIG. 5 is a third cross-sectional view of a liquid separation device, in accordance with an embodiment of the present invention. In particular, FIG. 5 depicts the third cross-sectional view 500 of the liquid separation device 108. As in the second cross-sectional view 400 of FIG. 4, like-numbered components have the same functions, unless otherwise noted.

The liquid separation device 108 includes the LNG inlet 310 that is configured to received mixed phase fluid 326. In the third cross-sectional view 500, the liquid separation device includes a plurality of separators 312 disposed within the canister 302. The plurality of separators are fluidly connected to the LNG inlet 310 in parallel. The fluid connection 314 between the LNG inlet 310 to the plurality of separators 312 may further include a T-connection 502 and a plurality of elbow-connections 504 to direct the flow from the LNG inlet 310 to the separators 312 in a parallel flow configuration. Branching the flow into a parallel configuration to the separators 312 reduces restriction of the flow to permit venting and draining of vapor and liquid, respectively, from the liquid separation device 108.

In some embodiments, the number of separators 312 in the plurality of separators is based on a planned flow rate in the relief vent line 204. The planned flow rate may be based at least in part on an operating pressure of the LNG system, and the size and quantity of the pressure relief valves 202. The planned flow rate may further account for a transition from vapor being released through the pressure relief valve 202 to mixed phase or a fluid being released through the pressure relief valve 202. With a varying number of separators 312, the fluid connection 314 between the LNG inlet 310 and the separators 312 may be altered as such to provide flow from the LNG inlet 310 to the plurality of separators 312 in a parallel configuration. Further, a volume measurement of the interior space 304 may be based in part on a planned flow rate in the relief vent line 204.

In one embodiment, a liquid separation device 108 is mounted to a mobile machine 102 that is a large mining machine. The mobile machine 102 includes a relief vent line 204 which is sized for the size and the number of relief valves in the system so that it does not restrict the flow of the relief line. In one such embodiment, the liquid separation device comprises two separators 312. In other embodiments, a different number of separators 312 are utilized to ensure flow is not restricted. For example, the liquid separation device 108 may include anywhere from one to eight separators 312.

The separators 312 allow vapor 318 to pass through to the interior space 304 and direct condensed fluid 316 to the bottom end 308. The vapor 318 fills the interior space 304 and exits the canister 302 via the vapor outlet 320. The vapor outlet 320 vents to atmosphere. The condensed liquid 316 flows out the liquid drain 322 that is disposed on the bottom end 308 of the canister 302. The liquid drain 322 may be fluidly connected to a fluid drain line 110 that further directs the condensed liquid 316 towards the ground surface 122.

In various embodiments, the liquid separation device 108 further includes a mounting connection 324 that is configured to mount the liquid separation device 108 to a LNG machine, such as the mobile machine 102. The liquid separation device 108 is mounted such that the LNG inlet 310 is fluidly connected to a relief vent line 204 (e.g., downstream of an LNG pressure relief valve 202) of the LNG machine and that the vapor outlet 320 is disposed at a higher elevation than the liquid drain 322. Example mounting connections 324 may include studs or posts to receive a bolt, extension posts that may be welded or otherwise affixed to the mobile machine 102, slots and/or tabs that mate with a corresponding tab and/or slot on the mobile machine 102, a strap configured to retain the canister 302 of the liquid separation device 108 to the mobile machine, or the like.

In the various embodiments disclosed herein, the components described herein are manufactured of materials capable of withstanding temperature differentials associated with operating of an LNG system. Example materials include those suitable for being in contact with various cryogenic fluids, such as stainless steel, low-temperature carbon steel, various aluminum and brass alloys, corrosion resistant alloys such as Type 304/304L stainless steel and 316/316L stainless steel, and the like.

Figure 6:
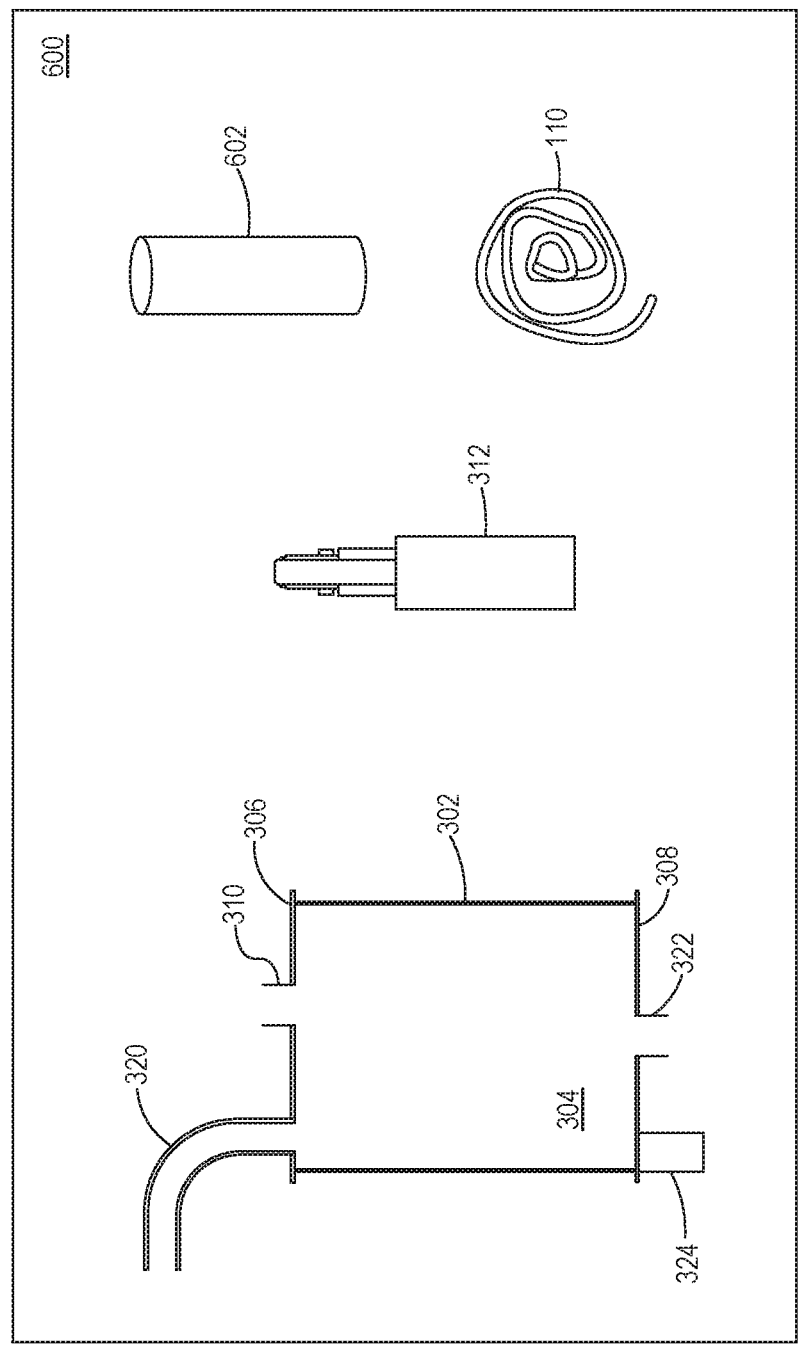
FIG. 6 is view of a kit for a liquid separation device, in accordance with an embodiment of the present invention.

FIG. 6 is view of a kit for a liquid separation device, in accordance with an embodiment of the present invention. In particular, FIG. 6 depicts the view 600 of a kit having components of the liquid separation device 108 that is to be installed on a machine having a LNG system, such as the mobile machine 102. The mobile machine 102 may be retrofitted from a diesel-only engine powered mobile machine to a LNG powered machine, or the mobile machine 102 may be manufactured as LNG powered machines. In any event, an operator of a mobile machine 102 may have a desire to procure a kit, such as the on depicted in the view 600, having various components associated with a liquid separation device described herein.

In one embodiment, the kit includes a canister 302, a separator 312, tubing 602 to fluidly connect the LNG inlet 310 of the canister 302 to the separator 312, and mounting connections 324.

The canister 302 may be any canister 302 described herein, and includes the LNG inlet 310 disposed at the top end 306 of the canister 302, with the LNG inlet 310 being configured to receive mixed phase fluid into the canister 302. The canister 302 further includes a vapor outlet 320 disposed at the top end 306 of the canister 302 and a liquid drain 322 disposed at the bottom end 308 of the canister 302.

The separator 312 is configured to direct condensed liquid to the bottom end 308 and to pass vapor through to the interior space 304. The tubing 602 fluidly connects the LNG inlet 310 to the separator 312 when the separator is disposed within the interior space 304. The tubing 602 may be include the various components of the fluid connection 314, including any t-connections 502 or elbow-connections 504 to fluidly connect the separator(s) to the LNG inlet 310.

The mounting connection 324 are configured to mount the canister 302 to a mobile machine 102. Mounting of the canister 302 results in orienting the top end 306 having the vapor outlet 320 above (e.g., at a higher elevation when the mobile machine 102 is on a level ground surface 122) the bottom end 308 having the liquid drain 322.

In some embodiments, the kit of the view 600 further includes a fluid drain line 110 that is configured to fluidly connect to the liquid drain 322 and to route the condensed fluid from the bottom end 308 of the canister 302 to the ground surface 122. As such, the fluid drain line 110 includes sufficient length to extend from the liquid separation device 108 to be in proximity (e.g., 0.5 to 1.5 meters) from the ground surface 122.

In yet another embodiment, the kit of the view 600 further includes a plurality of separators 312 and the tubing 602 is configured to fluidly connect the LNG inlet 310 to the plurality of separators 312 in parallel.

In some embodiments, the canister 302 is a sealed canister, with the separator(s) 312 already disposed within the canister and fluidly connected via the tubing 602 to the LNG inlet 310. In other embodiments, the canister 302 is an unsealed canister, and the interior space 304 may be accessed by a technician. The technician may assemble the tubing 602 to the separator(s) 312 and the LNG inlet 310 and then close the canister 302.

It is also appreciated that the components of the kit depicted in the view 600 may include any the various embodiments described herein. For some non-limiting examples of various components to be included in the kit, the canister 302 may include a sloped surface 404. Further, the kit may include an insulation layer 402 configured to insulate the exterior surface 406 of the canister 302. Also, the separators 312 may also include a plurality of separators 312 and the fluid connection 314 may include the associated fluid connections to connect the plurality of separators 312 to the LNG inlet 310.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A mobile machine powered by a liquid natural gas (LNG) system, the mobile machine comprising:
   a natural gas engine;
   a LNG fuel tank to provide natural gas to the natural gas engine;

a pressure relief valve to relieve excess pressure from the LNG system to a relief vent line; and a liquid separation device having;
a canister defining an interior space and having a top end and a bottom end;
a LNG inlet configured to receive mixed phase fluid into the canister from the relief vent line;
a separator disposed within the interior space and fluidly connected to the LNG inlet, the separator configured to direct condensed liquid to the bottom end and to pass vapor to the interior space;
a vapor outlet disposed on the top end of the canister; and
a liquid drain disposed on the bottom end of the canister and having a fluid drain line fluidly connected thereto, wherein the liquid separation device is mounted to a mobile machine such that the vapor outlet is disposed at a higher elevation than the liquid drain, with the vapor outlet venting the vapor to the atmosphere proximate the mobile machine and a distal end of the fluid drain line being disposed at a lower elevation than the vapor outlet and draining the condensed liquid from the mobile machine.

2. The mobile machine of claim 1, wherein the fluid drain line is routed through the mobile machine to dispense the condensed liquid under a chassis of the mobile machine.

3. The mobile machine of claim 1, wherein the fluid drain line is routed through the mobile machine to dispense liquid between a first ground engaging member and a second ground engaging member of the mobile machine.

4. The mobile machine of claim 1, wherein the liquid separation device further comprises an insulation layer on an exterior surface of the canister.

5. The mobile machine of claim 1, wherein the bottom end of the canister comprises a sloped surface to direct the condensed liquid to the liquid drain.

6. The mobile machine of claim 1, wherein the liquid separation device further comprises a plurality of separators disposed within the canister and fluidly connected to the LNG inlet in parallel.

7. The mobile machine of claim 6, wherein a number of separators in the plurality of separators is based on an planned flow rate in the relief vent line.

8. The mobile machine of claim 1, wherein the separator comprises a sintered material.

9. The mobile machine of claim 1, wherein the mobile machine comprises a large mining truck.

10. A liquid separation device comprising:
a canister defining an interior space and having a top end and a bottom end;
a liquid natural gas (LNG) inlet configured to receive mixed phase fluid into the canister;
a separator disposed within the interior space and fluidly connected to the LNG inlet, the separator configured to direct condensed liquid to the bottom end of the canister and to pass vapor to the interior space;
a vapor outlet disposed on the top end of the canister;
a liquid drain disposed on the bottom end of the canister and having a fluid drain line fluidly connected thereto; and
a mounting connection configured to mount the liquid separation device to a mobile machine such that the LNG inlet is fluidly connected to a LNG vent line of the mobile machine, wherein the vapor outlet is disposed at a higher elevation than the liquid drain, with the vapor outlet venting the vapor to the atmosphere proximate the mobile machine and a distal end of the fluid drain line being disposed at a lower elevation than the vapor outlet and draining the condensed liquid from the mobile machine.

11. The liquid separation device of claim 10, wherein the fluid drain line routes the condensed liquid to a ground surface.

12. The liquid separation device of claim 10, wherein the liquid separation device is configured to be installed downstream of a LNG pressure relief valve of a mobile machine.

13. The liquid separation device of claim 10, wherein the liquid separation device comprises a plurality of separators disposed within the canister and fluidly connected to the LNG inlet in parallel.

14. The liquid separation device of claim 10, wherein the separator comprises a sintered material.

15. The liquid separation device of claim 10, wherein the bottom end comprises a sloped surface to direct the condensed liquid to the liquid drain.

\* \* \* \* \*